US010313956B2

(12) United States Patent
Daragon et al.

(10) Patent No.: US 10,313,956 B2
(45) Date of Patent: Jun. 4, 2019

(54) COMMUNICATION METHOD WITHIN A DYNAMIC-DEPTH CLUSTER OF COMMUNICATING ELECTRONIC DEVICES, COMMUNICATING ELECTRONIC DEVICE IMPLEMENTING SAID METHOD AND ASSOCIATED SYSTEM

(71) Applicants: TRAXENS, Marseilles (FR); INSTITUT NATIONAL DE RECHERCHE EN INFORMATIQUE ET EN AUTOMATIQUE, Rocquencourt (FR)

(72) Inventors: Pascal Daragon, Greasque (FR); Natale Guzzo, Marseilles (FR); Arulnambi Nandagoban, Marseilles (FR); Nathalie Mitton, Villeneuve d'Ascq (FR)

(73) Assignees: TRAXENS, Marseilles (FR); INSTITUT NATIONAL DE RECHERCHE EN INFORMATIQUE ET EN AUTOMATIQUE, Rocquencourt (FR)

( * ) Notice: Subject to any disclaimer, the term of this patent is extended or adjusted under 35 U.S.C. 154(b) by 0 days.

(21) Appl. No.: 15/560,325

(22) PCT Filed: Mar. 24, 2016

(86) PCT No.: PCT/FR2016/050670
§ 371 (c)(1),
(2) Date: Sep. 21, 2017

(87) PCT Pub. No.: WO2016/151259
PCT Pub. Date: Sep. 29, 2016

(65) Prior Publication Data
US 2018/0070287 A1 Mar. 8, 2018

(30) Foreign Application Priority Data

Mar. 25, 2015 (FR) .................................. 15 52522

(51) Int. Cl.
H04W 40/32 (2009.01)
H04W 4/38 (2018.01)
(Continued)

(52) U.S. Cl.
CPC ............ H04W 40/32 (2013.01); H04L 45/02 (2013.01); H04W 4/38 (2018.02); H04W 84/18 (2013.01);
(Continued)

(58) Field of Classification Search
CPC ....... H04W 40/32; H04W 4/38; H04W 84/18; H04W 8/005; H04L 45/00; H04L 45/02; H04L 45/20; H04L 45/46; H04L 67/12
See application file for complete search history.

(56) References Cited

U.S. PATENT DOCUMENTS

2006/0215673 A1* 9/2006 Olvera-Hernandez ...................... H04L 45/46
370/406
2007/0291772 A1* 12/2007 Andersson .......... H04L 41/0893
370/400
(Continued)

OTHER PUBLICATIONS

International Search Report (PCT/ISA/210) dated May 31, 2016, by the European Patent Office as the International Searching Authority for International Application No. PCT/FR2016/050670.
(Continued)

Primary Examiner — Paul H Masur
(74) Attorney, Agent, or Firm — Buchanan Ingersoll & Rooney PC

(57) ABSTRACT

The invention relates to a communication method within a network of wireless communicating electronic devices mak-
(Continued)

ing it possible to dynamically and automatically control the propagation of enrollment messages during the creation of clusters. The invention also relates to any electronic device implementing said communication method and to any system comprising such a device. Such a communicating electronic device comprises a processing unit cooperating with a program memory comprising instructions of a program, of which the execution or interpretation by said processing unit causes the communication method to be implemented.

15 Claims, 3 Drawing Sheets

(51) Int. Cl.
*H04L 12/751* (2013.01)
*H04W 84/18* (2009.01)
*H04L 12/701* (2013.01)
*H04W 84/20* (2009.01)
*H04L 29/08* (2006.01)
*H04W 8/00* (2009.01)

(52) U.S. Cl.
CPC .............. *H04L 45/00* (2013.01); *H04L 67/12* (2013.01); *H04W 8/005* (2013.01); *H04W 84/20* (2013.01)

(56) References Cited

U.S. PATENT DOCUMENTS

| | | | | |
|---|---|---|---|---|
| 2008/0247353 | A1* | 10/2008 | Pun | H04L 45/46 370/328 |
| 2010/0090823 | A1* | 4/2010 | Park | G01S 5/0294 340/539.1 |
| 2010/0115009 | A1* | 5/2010 | Callahan | G06F 17/30067 707/825 |
| 2010/0169446 | A1* | 7/2010 | Linden | G06F 11/181 709/206 |
| 2014/0301245 | A1* | 10/2014 | Rose | H04L 41/0823 370/255 |
| 2015/0109926 | A1* | 4/2015 | Jin | H04W 40/22 370/235 |
| 2016/0242101 | A1* | 8/2016 | Van Phan | H04W 76/14 |

OTHER PUBLICATIONS

Written Opinion (PCT/ISA/237) dated May 31, 2016, by the European Patent Office as the International Searching Authority for International Application No. PCT/FR2016/050670.

Guzzo et al., "A Cluster-based and On-demand routing algorithm for Large-Scale Multi-hop Wireless Sensor Networks", Sep. 2014, pp. 1-8, Retrieved from the Internet: URL:https://hal.inria.fr/hal-01057738/document.

Safa et al., "A cluster-based trust-aware routing protocol for mobile ad hoc networks", The Journal of Mobile Communication, Computation and Information, May 2009, pp. 969-984, vol. 16, No. 4.

Ducrocq et al., "Energy-based clustering for wireless sensor network lifetime optimization", IEEE Wireless Communications and Networking Conference, Apr. 2013, pp. 968-973.

Heinzelman et al., "An Application-Specific Protocol Architecture for Wireless Microsensor Networks", IEEE Transactions on Wireless Communications, Oct. 2002, pp. 660-670, vol. 1, No. 4.

* cited by examiner

COMMUNICATION METHOD WITHIN A DYNAMIC-DEPTH CLUSTER OF COMMUNICATING ELECTRONIC DEVICES, COMMUNICATING ELECTRONIC DEVICE IMPLEMENTING SAID METHOD AND ASSOCIATED SYSTEM

BACKGROUND

The invention relates to a method for joining a cluster of communicating electronic devices, said method being implemented by a processing unit of one of said electronic devices communicating with peers through a wireless communication network.

The invention further relates to a system including a plurality of communicating electronic devices implementing such a joining method.

As a non-limiting example preferred application, the invention is described through an example application relative to the collection of physical properties, for example a temperature, moisture level, brightness, vibration frequency, shocks, etc., related to the internal and/or external environments of containers of goods or merchandise, or more generally, containers. According to the example application, said containers are grouped together and/or stacked in a storage area or traveling on a transport platform such as a container ship, a freight train or any other appropriate transportation platform. Each container cooperates with one of said communicating electronic devices. The latter are responsible for collecting and conveying said properties through service messages to peer devices acting as "cluster heads" or "heads." One of the missions of a communicating electronic device acting as a cluster head, which we will call "Head" in the rest of the document, consists of carrying out a predetermined service. Such a service may for example consist of aggregating data collected by the communicating devices and sending said data, after it has been aggregated, to a remote entity, through a long-range or long-distance connection of the satellite connection or radio telephony connection type. The invention cannot, however, be limited solely to this example application. More generally, a Head is responsible for carrying out a given service related to data collected and conveyed by its peers, said given service being able to relate to supervision or alarm management, in place of or in addition to communication with a remote entity.

Numerous typologies or configurations of networks of communicating objects exist. FIG. 1 schematically shows two examples of wireless communication networks. Irrespective of the operated network, each communicating electronic device, which will also generally be called "node" of said network, implements a communication method allowing it to exchange data messages and/or service messages with a third-party or peer node. Thus, the network N1 situates forty communicating electronic devices respectively referenced a1 to a8, b1 to b8, c1 to c8, d1 to d8 and e1 to e8 in FIG. 1.

Such a network is generally described as a multi-hop network. According to this typology, a first node, which we will call "source," develops a service message, represented in FIG. 1 by double arrow, comprising data related, non-limitingly, to a property measured by a sensor cooperating with said first node, intended for a second "recipient" node.

Unlike a necessarily direct communication between two nodes of a single-hop network, the communication between first and second nodes may be direct or indirect between two nodes of a multi-hop network such as the network N1 according to FIG. 1. Thus, according to an indirect communication, a message sent from a source node can be relayed by one or several third-party or intermediate nodes, the respective roles of which consist of relaying said message from the source node so that said message is in fine conveyed to and received by the recipient node. Such nodes make up clusters. As an example, a cluster C11 is shown by a circle in dotted lines in FIG. 1. The path followed by a service message originating from a source node and intended for a receiving node, via one or several relay nodes, is generally called "route." Thus, according to FIG. 1, a message sent from the node a4 to the node d2 will successively be relayed by the relay nodes b4 and c3.

The communication within multi-hop communication networks is generally done by radio. Such communication is generally short-range, i.e., several meters to several tens of meters, such that service messages are transmitted from one to another between the different nodes. When data is supposed to be conveyed to a server, or more generally a remote entity, a second communication mode is implemented, for example, by GSM (Global System for Mobile Communication) or GPRS (General Packet Radio Service), or by satellite connection.

As indicated as a preferred example by FIG. 2, a node generally and primarily consists of a communicating electronic device 10 including a processing unit 11, for example in the form of a microcontroller, cooperating with a data memory 12, optionally a program memory 14, said memories optionally being separated. The processing unit 11 cooperates with said memories 12 and 14 using internal communication buses, shown in FIG. 2 by double arrows with a simple line. Generally, a communicating electronic device 10 includes one or several measuring sensors 15 for measuring a physical property related to the environment of said device 10. Such a sensor can measure the surrounding temperature, a moisture level or the presence and/or absence of light. The device 10 further includes first communication means 13 cooperating with the processing unit 11 and providing wireless nearby communication with any other communicating electronic device 10i situated within communication range. It may also include second communication means 16 of the "long-distance" type also cooperating with the processing unit 11. These second communication means allow such a device 10 the ability to send a remote entity, for example a server RS, data through messages MC distributed by a network RR for example using the GSM, GPRS or satellite technologies. To operate, i.e., in order for the processing unit 11 to carry out a method derived from the interpretation or performance, by said processing unit, of program instructions P saved in the program memory 14, the device 10 includes an electricity source 17, in the form of one or several batteries, for example. A node's capacity to communicate, or quite simply to be able to operate, is directly related to the remaining and available energy capacity of said node. Indeed, the exchanges between nodes, the processing operations or calculations implemented by the latter use exchanged data, as well as the possible and remote conveyance of data collected within a network or a cluster of communicating electronic devices, are all electricity-consuming actions.

Some builders or operators have tried to optimize networks or communication methods, implemented by nodes within a network or a cluster, to globally preserve the electricity capacity of the network or the cluster. Globally, a first approach consists of distributing the energy cost resulting from exchanges between the nodes over all of said nodes of the network or the cluster. A second approach consists of distributing the energy consumption resulting from the processing operations implemented on collected data, for example a long-distance transmission, over most of the nodes, thus pooling the electricity consumption over a plurality of nodes. Thus, whether the contactless communication network is in the single-hop or multi-hop configuration, a node may arbitrarily be designated or promoted as "Head," or at the very least as cluster head, or Head node. In connection with FIG. 1, a device acting as Head is shown by a circle drawn in thick lines. This is node d2 for network N1. The node d2 thus acts as Head of the clusters C11. In this way, the consumed energy, in particular for the remote transmission of data collected within a network, is pooled over a plurality of nodes. Alternatively, the heads can be designated randomly, or more specifically can designate themselves as heads randomly, as long as the latter have sufficient hardware and/or software resources to carry out a predetermined service.

As an example, the "LEACH" method, as in particular described by the document titled "An Application-Specific Protocol Architecture for Wireless Microsensor Networks" (W. Heinzelman, A. Chandrakasan, H. Balakrishnan—IEEE TRANSACTIONS ON WIRELESS COMMUNICATIONS, VOL. 1, NO. 4, OCTOBER 2002), makes it possible, in a single-hop network, to randomly designate a node for it to become Head. The other nodes belonging to the cluster of said Head, nodes that we will respectively call "Member," send the cluster Head, therefore the Head, their service messages. In connection with FIG. 1, each Member node is shown by a circle drawn in thin lines. Thus, within the network N1, the Head d2 communicates directly with the nodes c1 to c4, d1, d3 and d4, as well as with the nodes e1 to e4. Via the Member c1, the Head d2 communicates with the Member b1, which in turn can relay messages to or from the Member a1. The Head d2 collects said data sent from different Member nodes, processes it, aggregates it or consolidates it, and for example initiates a long-range transmission to a remote entity, such as a server RS described in connection with FIG. 2. According to the known technique, once a node has acted as Head, it cannot assume this role again before a predetermined length of time has passed. A new Member node is then randomly designated Head, thus ensuring a continuity of service. In order for a node, which we will call "loose," represented by a circle shown in double lines in connection with FIG. 1, to be able to "join" a Head and thus form a cluster or join an existing cluster, such a loose node, situated within radio range of a promoted node or node designated as Head, is arranged to receive an enrollment message MH coming from said Head, generally issued in the form of an undifferentiated transmission (also called "broadcast") of enrollment messages MH intended for any node situated within radio range of the Head. FIG. 1 makes it possible, through the network N1, to describe the resultant of a transmission of a message MH sent from the node d2, designated to act as Head, this message MH being sent according to a short-range broadcast mode to the nodes situated within communication range. Upon receiving such an enrollment message MH, a loose node, for example the node e2, updates its data memory, said memory cooperating with the processing unit to record the coordinates or the value of the identifier of the Head therein, or the identifier of the node d2 in connection with FIG. 1. The device e2, previously loose, becomes a Member of the cluster C11. It thus appears shown by a circle in thin lines in FIG. 1. The device d2, acting as Head, becomes the recipient of any service message MS including data collected by the device e2 newly having become a Member of the cluster C11 like the other Member devices of said cluster. The transmission of the message MH by the node d2 has a limited range. Consequently, nodes situated outside the range do not receive the message MH as an intelligible message, or do not receive it all. The nodes that are outside the range of d2, such as the nodes a5 to a8, or the nodes b5 to b8, remain loose nodes, shown by circles drawn in double lines. The cluster C11 only includes the node d2, acting as Head, and the Member nodes, i.e., having accepted the enrollment of the Head d2.

Transposing the LEACH teaching to the context of a multi-hop network, like the network N1 described in connection with FIG. 1, could lead one to believe that the nodes, becoming Members of a cluster including a node acting as Head, record, within their respective data memories, the route, i.e., the value of the identifier of the node acting as Head and at least the value of the identifier of the node having relayed the enrollment message of said Head, or alternatively, the respective values of the identifiers of the intermediate or relay nodes separating it from said Head. Thus, as an example, the node c2 saves the value of the identifier of the Head d2, having directly received an enrollment message MH from said node d2. The node b2 in turn also records the value of the identifier of the node d2, the value of that of the node c2 having relayed the enrollment message MH of d2 in favor of the node b2.

In theory, or at least according to a perfect application mode, such an approach makes it possible to preserve the overall energy resources of a communication network including a plurality of communicating nodes. In practice or in reality, and in particular according to application or operating domains of such a communication network in connection with the transport of containers cooperating with communicating electronic devices, such a solution remains irrelevant, or at least ineffective.

Indeed, let us consider the example of the preferred and non-limiting example consisting of the use of a wireless communication network whose nodes record, collect and send measurements related to a plurality of containers, such as containers of goods or merchandise. Imagine that each container is associated with a communicating electronic device implementing a communication method such as LEACH or an equivalent of the multi-hop type. According to this hypothesis, each communicating electronic device associated with a container acts as node within the wireless network, like the network N1 described in connection with FIG. 1. Let us imagine that the communication mode between nodes is done by radio channel. Aside from the fact that a communication method of the LEACH type requires a single-hop approach, thus requiring each node to be able to communicate directly with a Head, the relative arrangement of the containers, for example on a ship, in a storage area or on any road or rail transport platform, creates an application context, such that a node designated as Head may not or may no longer be able to perform its mission, for example consisting of sending aggregated data to a remote unit, due solely to its positioning in a stack of containers, for instance. Indeed, there are many obstacles formed by a transport platform and/or a storage area, due to the partitioning or partial confinement imposed by the structure receiving the containers, or by the interactions mutually created by the containers themselves, the stacking of which may cause a deterioration, or even loss of the ability for a Head to perform a long-range transmission. The risk of data loss, slow data conveyance, as well as needless and irrelevant energy expenses to "animate" a cluster whose Head would not be able to effectively perform its role or service, is high. This risk is even higher in the case where random elections of consecutive heads results in fruitless "choices." To resolve such drawbacks, the applicants have designed a wireless communication network that is particularly innovative and high-performing, irrespective of the relative arrangement of the nodes and irrespective of the application or operating framework of said network, whether it is of the single-hop or multi-hop type. Such a network makes it possible to optimize the overall capacity of the network to perform a predetermined service from data collected by the different nodes. It is primarily based on a method of joining a cluster of communicating devices according to the capacity of a Head to assume such a role, for example and non-limitingly to send data according to a long-distance communication mode. Each node implementing such a method may decide to act as Head if it is capable of doing so. Furthermore, any loose node may decide whether to join a cluster based on the capacity of the Head, advantageously self-designated. Additionally, the applicants have designed a wireless communication network, particularly innovative and robust, including when nodes making up said network are mobile relative to one another or when the topology of said network proves to be particularly fluctuating. According to this innovation, any loose node may request, on demand, an affiliation procedure with a Member of a cluster. Such an affiliation procedure may follow from an adaptation of a network like that previously described and illustrated in connection with FIG. 1. An affiliation request of a loose node is shown by an arrow in double lines. In the case at hand, it involves the loose node a4, previously loose, which is requesting an affiliation with the node b4, Member of the cluster C11 whose Head is the node d2. The node a4 becomes Affiliated with the cluster C11, shown by a broken circle. Thus, while a4 was not situated to receive an enrollment message MH from the Head d2, it can, at its request, join the cluster C11. Each node, implementing such an affiliation procedure, can more generally, at its request and independently of the enrollment policy of a Head, requested affiliation from a Member of a cluster, and thus send service messages to said Head, in particular via the Member node having accepted the affiliation procedure. It is thus possible to extend clusters formed after an enrollment procedure, or even to transform a single-hop network into a "pseudo-multi-hop network," or more specifically to adapt a single-hop network whereof a cluster becomes a multi-hop-type structure, a Member node, having accepted an affiliation request, working as a relay node of the affiliated node to send service messages.

Irrespective of the type of network operated, the respective capacities of the nodes implementing a joining and/or affiliation method with a cluster evolve over time.

Although it proposes a significant advance, such a solution, like the aforementioned concurrent solutions, has certain limitations or drawbacks, in particular if such a communication network is used in an application context for which the topology of said network is particularly prone to change. Indeed, irrespective of the selected communication network, the routes or topologies, i.e., the formation or destruction of clusters, of said network are not updated regularly enough or often enough to account for the dynamics of said network. Using known solutions, if such updates were done at a high frequency, the number of enrollment, cluster destruction or service messages would increase tenfold, such that the main objective of preserving energy consumption of the nodes of the network would not be met.

Furthermore, the establishment of a very deep cluster, i.e., according to which a Member can be located at a substantial difference in number of hops, can generate significant message traffic inherent, for example, to the enrollment MH or service MS message relayed by the relay Members. Such relays iterated at a high frequency, which is also by numerous Members, can compromise the energy capacities of said relay Members to collect data, produce and transmit their own service messages to a Head. For a single-hop network, the depth is set at one hop. For a multi-hop network, there is no known method making it possible to wisely limit, or even dynamically regulate, the depth of a cluster homogenously and in a controlled manner.

SUMMARY

The invention makes it possible to resolve all or some of the drawbacks raised by the known solutions. By forming a wireless communication network, particularly innovative and high-performing, irrespective of the relative arrangement of the nodes and irrespective of the application or operating context of said network, the invention makes it possible to optimize the overall capacity of the network to provide a determined service from data collected by the various nodes. The main originality of the method for joining a cluster of communicating electronic devices lies in the terms for electing Heads and/or the ability imparted to any node to accept or modulate its function as a relay Member. Each node implementing a method according to the invention may decide to act as Head by specifying the cluster depth it desires. Each node may further, depending on its capacity to dedicate a portion of its resources to the enrollment or service message relay, for example, maintain or limit this action. Such a limitation results in reducing the depth of the cluster of which the node is a Member, or at the very least, limiting the downlink route to which said node belongs.

The numerous advantages procured by the invention include that the latter makes it possible to:
relevantly regulate energy expenses on the nodes of the network, thereby extending the capacity of said network to perform a service in an unparalleled manner relative to the state of the art;
design a network, or at least a node structure, automatically adaptable and functional as changes occur in the relative positions between the nodes or the operating conditions of said nodes evolve, for example during handling, storage or transport of containers each associated with an electronic device according to the invention;
favor the robustness of the service, for example the transmission of data by long-range channel, by giving each node according to the invention the opportunity to determine its role within the network.

To that end, the invention first relates to a communication method within a network comprising a plurality of communicating electronic devices, said method being implemented by a processing unit of a first communicating electronic device from among said communicating electronic devices within the network, said first communicating electronic device further including said processing unit, a data memory, first communication means providing wireless nearby communication with a third-party communicating electronic device of the network situated within communication range, said data memory and said first communication means cooperating with said processing unit, the data memory including the value of an identifier dedicated to said first communicating electronic device and a record to store the current value of an identifier of a second communicating electronic device acting as Head of a cluster. Such a method includes:
- a step for receiving, via the first communication means, an enrollment message delivered and transmitted by a communicating electronic device within the network, said enrollment message encoding the identifier of the second communicating electronic device acting as cluster head;
- a step for decoding said enrollment message and deducing the value of said identifier of the second communicating electronic device acting as cluster head therefrom and, if applicable, the value of the identifier of a third communicating electronic device having relayed said enrollment message;
- a step for updating the record so that the latter stores, as current identifier value of the device acting as cluster head, said value of the identifier of the second device acting as cluster head deduced from the decoded enrollment message and, if applicable, said record also saves, as uplink route toward said second communicating electronic device acting as cluster head, the value of the identifier of the third communicating electronic device.

To control the cluster depth, the invention sets out that:
- said enrollment message further includes a datum TTL reflecting the ability of a communicating electronic device receiving said enrollment message to relay the latter;
- the step for decoding said enrollment message further deduces the value of said datum TTL therefrom;
- the step for updating the record is adapted so that said record stores the current value of said datum TTL previously decremented by one unit.

The invention further sets out that a communication method according to the invention includes:
- a step for producing a relayed enrollment message, said message comprising:
  - a. a first field encoding the current identifier value of the device acting as cluster head recorded in the record;
  - b. a second field characterizing an uplink route toward the second communicating electronic device acting as cluster head, and encoding the identifier of the first communicating electronic device;
  - c. a third field encoding the current value of the datum TTL recorded in the record;
- a step for triggering the transmission by the first communication means of said relayed message if a prior step, consisting of comparing the current value of the datum TTL recorded in the record to a determined floor value, attests that said current value of TTL is strictly greater than said floor datum.

So as advantageously to verify that the second communicating electronic device is indeed capable of acting as cluster head:
- the received enrollment message may include a datum reflecting the capacity of the second communicating electronic device acting as cluster head to provide a given service;
- the step for decoding said enrollment message may further deduce, from said enrollment message, said datum reflecting said capacity;
- the step for updating the record may further consist of recording, in said record, the value of said datum reflecting the capacity of the device acting as cluster head.

According to this advantageous embodiment, the first communicating electronic device may decide to join the cluster of the second communicating electronic device according to certain abilities of the latter. To that end, the step for updating the record and recording the current identifier value of the communicating electronic device acting as cluster head therein may advantageously only be performed if the datum reflecting said capacity is greater than or equal to a determined minimum requirement threshold.

In order to implement a cluster depth reduction, the invention sets out that a communication method may include:
- a step for receiving an end of relay message developed and transmitted by the third communicating electronic device, said end of relay message including the identifier of said third communicating electronic device;
- a step for decoding said end of relay message and for deducing the value of said identifier therefrom;
- a step for updating the record encoding the current value of an identifier of the device acting as cluster head, to erase said current value or replace it with a predetermined value reflecting an absence of identifier of the device acting as cluster head, said update of the record only being done if the value of the identifier deduced from the end of relay message is comprised in the record as uplink route toward said device acting as cluster head.

In order for a Member of a cluster itself to be able to suspend its role as relay Member and thus preserve its ability to produce and send a service message to the device acting as cluster head, the step consisting of comparing the current value of the datum TTL recorded in the record to a determined floor value may further consist of producing a capacity to relay messages in favor of communicating electronic devices, said communicating electronic devices belonging to a downlink route from the first communicating electronic device, according to a functional parameter of said device, and comparing said produced capacity to a predetermined minimum functional threshold. The step for triggering the transmission by the first communication means of said relayed message is then only implemented if said produced capacity is strictly greater than said predetermined functional minimum threshold.

In order to regulate the cluster depth induced by the reception of the message encoding a datum TTL lower than that of the previous enrollment message, the invention sets out a first embodiment according to which the step for updating the record following the decoding of an enrollment message may further consist of triggering, concomitantly with the update of the record, means for measuring a duration, said communication method including a step for comparing said duration to a predetermined maximum waiting period and updating said record and erasing or replacing the current identifier value of the communicating electronic device acting as cluster head with a predetermined value reflecting absence of identifier of the communicating electronic device acting as cluster head.

According to a second embodiment, an enrollment message may include a field encoding a datum TTL-e characterizing the maximum cluster depth desired by the second communicating electronic device acting as cluster head and a field encoding a datum DST characterizing the distance separating the communicating electronic device sending said enrollment message on a downlink route from the communicating electronic device acting as cluster head (d2). According to this second embodiment, the step for decoding said enrollment message may deduce the values of said data TTL-e and DST therefrom. The step for updating the record may also be adapted so that said record stores the value of the datum TTL-e and the value, previously incremented by one unit, of the datum DST. The invention sets out that said communication method may further include a step for comparing said values TTL-e and DST recorded in the record and for updating said record and erasing or replacing the current identifier value of the communicating electronic device acting as cluster head with a predetermined value reflecting absence of device identifier acting as cluster head.

Irrespective of the embodiment of a communication method according to the invention, the first communicating electronic device may dynamically determine the relevant depth of the cluster for which it wishes to act as cluster head. To that end, the communication method according to the invention may advantageously include:
- a step for determining the maximum depth of the cluster for which the first communicating electronic device wishes to be cluster head according to an operating parameter of said device;
- a step for encoding an enrollment message and triggering the sending of said message by the first communication means, said message including a first field encoding the identifier of said first communicating electronic device and a second field encoding the datum TTL whereof the value is initialized to that of the produced maximum cluster depth.

Alternatively, such a communication method may include:
- a step for determining the maximum depth of the cluster of which the first communicating electronic device wishes to be cluster head according to an operating parameter of said device;
- a step for encoding an enrollment message and triggering the transmission of said message by the first communication means, said message including fields respectively encoding:
  a. the identifier of said device;
  b. the datum TTL whereof the value is recorded in the record;
  c. the datum TTL-e whereof the value is initialized at that of the maximum depth of the determined cluster;
  d. the datum DST whereof the value is initialized at a value indicating a zero distance in number of hops.

In order not to trigger the transmission of enrollment messages while the first communicating electronic device is not capable of fully assuming the role of cluster head, a communication method according to the invention may advantageously include a step for evaluating the capacity of the first communicating electronic device to perform a determined service, said step consisting of estimating an operating parameter of said device and producing a datum reflecting the capacity of said device to perform said determined service, and for which the step for encoding an enrollment message consists of providing, within said enrollment message, a field encoding said datum reflecting said capacity prior to triggering the transmission of said message by the first communication means.

Such a method may include a step for comparing the datum reflecting said capacity to a minimum functional requirement threshold and for which the step for triggering the transmission of the enrollment message is only implemented if the datum reflecting said capacity is greater than or equal to said minimum functional requirement threshold.

According to a second object, the invention relates to a computer program product including program instructions which, when they are:
- previously recorded in a program memory of a communicating electronic device further including a processing unit, first communication means providing wireless nearby communication with any other electronic devices situated within the communication range, a data memory recording the value of an identifier dedicated to the device and a record for encoding the current value of an identifier of a device acting as cluster head, said memories and said first communication means cooperating with said processing unit;
- executed or interpreted by said processing unit;
- cause the implementation of a communication method according to the invention.

According to a third object, the invention relates to a communicating electronic device including a processing unit, a data memory, a program memory, first communication means providing wireless nearby communication with any other communicating electronic device situated within communication range, said memories and said first communication means cooperating with said processing unit, the data memory including the value of an identifier dedicated to the communicating electronic device and a record to include the current value of an identifier of a device acting as cluster head. Such a communicating electronic device includes, in the program memory, the instructions for a computer program product as previously described and according to the invention.

According to a fourth object, the invention relates to a system including a plurality of communicating electronic devices also according to the present invention.

According to one preferred application, such a system may advantageously include a plurality of containers of goods, solid, fluid or liquid merchandise, said containers respectively cooperating with the communicating electronic devices, the latter each including a sensor cooperating with the processing unit to measure and collect a property related to the internal and/or external environments of said containers.

BRIEF DESCRIPTION OF THE DRAWINGS

Other features and advantages will appear more clearly upon reading the following description relative to one example embodiment provided for information and non-limitingly and upon examining the accompanying figures, among which.

DETAILED DESCRIPTION

Figure 1:
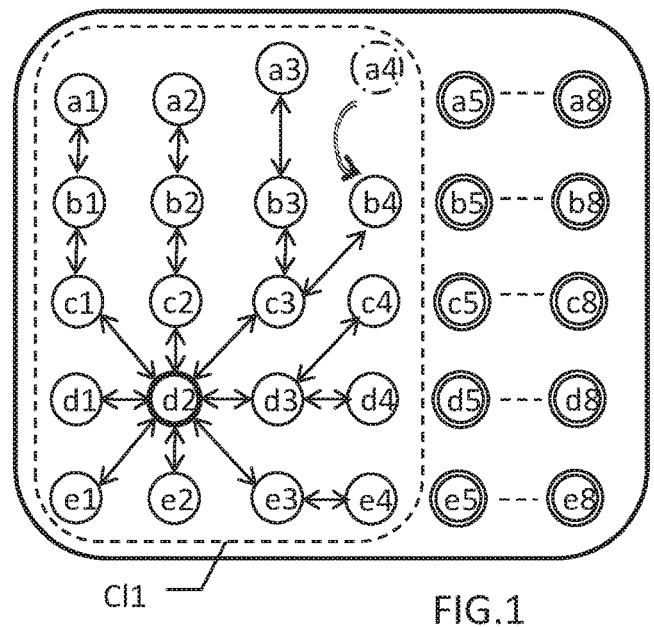
FIG. 1, previously described, illustrates an example multi-hop configuration of a wireless communication network.

A communicating electronic device according to the invention is comparable to a known device 10, like that previously described in connection with FIG. 2.

To that end, a communicating electronic device according to the invention includes a processing unit 11, consisting of one or several microcontrollers tasked with implementing processing operations on data in particular. Said data are advantageously recorded in whole or in part on one or several data memories 12, generally electrically erasable and writable. The data memory 12 can advantageously include a non-erasable section, physically isolated or simply arranged so that write or erase access is prohibited. Such access may alternatively require satisfying an authentication procedure. Such an advantageous section of the data memory 12, access to which for modifications is restricted, makes it possible in particular to record the value of an identifier ID therein dedicated to the communicating electronic device. Advantageously, but optionally, a device 10 may further include one or several program memories 14 to store one or several programs P, or more generally one or several sets of program instructions, said program instructions being intelligible by the processing unit 11. The execution or interpretation of said instructions by said processing unit causes the implementation of a data processing or operating method of the device 10. The latter also includes first communication means 13 providing wireless nearby communication with any other electronic device, such as the device 10$i$, on the condition that the latter is within communication range. Through said first communication means 13, the device 10, or more specifically its processing unit 11, can send and/or receive messages to or from third-party devices positioned within communication range. Such messages can be of any nature. The different types of messages include, but are not limited to, data messages MS related to a specific service S, enrollment messages MH, cluster destruction messages MR.

Some communicating devices may take advantage of the electromagnetic fields created by the network to draw sufficient electricity therefrom to perform their functions, if only during a short period of time. However, to ensure continuous operation and/or to implement processing operations requiring more energy, a communicating electronic device 10 according to the invention may advantageously include its own electricity source 17, in particular powering the processing unit 11, or any other element making up said device that requires it. Such a source 17 generally consists of a battery or a plurality of batteries. According to the favored application context in particular related to container monitoring, although this particular context cannot limit the operating scope of the invention, a communicating electronic device 10 can include one or several sensors 15 cooperating with the processing unit 11. Such a sensor can measure one or several properties related to the internal and/or external environments of said containers and produce the relevant data. As an example, as illustrated by FIG. 2, a sensor 15 can measure the temperature and/or humidity prevailing within a container, the darkness or loss of darkness within the enclosure attesting to the untimely opening of the container, or even impacts. If necessary, the sensor(s) can cooperate with the processing unit of a device via probes or conductive layers, in particular in the case where a device 10 is fixed against the outer wall of the container whereas one wishes to use said device 10 to supervise the inside environment of said container. Such a device 10 may further include a clock allowing it to timestamp the collected measurements, said clock not being shown in FIG. 2.

Depending on the service(s) one wishes to perform using the communicating electronic devices according to the invention, the latter may include additional and optional means. By way of preferred and non-limiting example, a service may consist of:

- collecting data from nodes of a network of communicating electronic devices according to the invention, for example in connection with the properties measured by said nodes;
- aggregating said data collected from a plurality of nodes, then developing messages MC encoding that consolidated service data intended for a remote entity, such as a server RS.

In order to send such messages MC, a device 10 advantageously includes a second long-distance communication means 16 cooperating with the processing unit 11. Such a communication may be done via a network RR, by GPRS or satellite channels, or through any other appropriate communication channel. The various internal components of the electronic device cooperate with the processing unit 11, advantageously by wired buses or by coupling. The device 10 may include a case housing said components, said case advantageously including fastening means to fix the device 10 on a support that one wishes to monitor, in the case at hand the controller according to the preferred example application.

To implement the invention, it is necessary to act on the operation of the processing unit, more specifically on a communication method implemented by said processing unit. Such a method will be described later in connection with FIG. 5. One preferred adaptation consists of providing a program, or more generally program instructions mutually arranged, to implement said method during the execution or interpretation of said program instructions by the processing unit. Advantageously, said program P is loaded in the program memory 14 during the assembly of said device, or by downloading said program into the memory 14 after said assembly phase of the device.

The invention primarily lies in the implementation of a network, advantageously a multi-hop network, for which each node consists of a communicating electronic device like the device 10 previously described.

A node of such a network is generally adapted or arranged to implement a joining and/or affiliation method with a cluster of devices. The data memory 12 includes, aside from the value of the identifier ID dedicated to the communicating electronic device, a record RH provided to include the current value IDHc of an identifier IDH of a communicating electronic device acting as Head, like the node d2 according to FIG. 1.

When a device chooses to join a cluster whereof one of the nodes is acting as Head, this joining is generally exclusive. In other words, a node cannot be a Member of separate clusters, i.e., respectively having different Head nodes, for a same service. This is then referred to as non-overlapping clusters. A node joining a cluster chooses the "best" head for said service. Such a selection can for example be made according to a specific capacity to perform a given service.

However, a node may also be attached to a plurality of Heads, if said heads are assigned to the implementation of separate services, such as, for example, a first Head for the transmission of long-distance data (service Si) and the second Head for implementing an alarm management service (service Sj) on a site.

To that end, like the LEACH solution, previously described, clusters of communicating electronic devices, like the clusters C11 of the network N1 described in connection with FIG. 1, include a device acting as Head, like the node d2 described in connection with FIG. 1. The other devices act as Members of the cluster, such as, non-exhaustively, the node c2 described in connection with FIG. 1. The role of a Member primarily consists of collecting information, for example measurements of environmental properties, translating them into data, then encoding said data in the form of a service message MS intended for a Head capable of performing the determined service. This Head recognizes said service messages MS, then carries out the determined service S. For example, such a service may consist of aggregating the data transmitted to the Head from several Members via messages MS, then implementing a long-distance transmission of said aggregated, or even consolidated, data in the form of messages MC intended for a remote entity RS.

A service message MS, sent from a Member of a cluster to a Head, is structured so as to include:
  information characterizing the type of message;
  the value of an identifier of the source node, also generally Member node;
  the value of an identifier of the recipient node, in the case at hand a Head, or even an identifier of a relay Member node in the case of a multi-hop network;
  data, for example related to properties measured by a sensor of the device;
  optionally, a redundancy code, or even a cryptogram or any other control information allowing a node receiving such a service message MS to decode it, exploit it or relay it.

A message MS, like any other message circulating within the network, can initiate acknowledgment of receipt messages MACK, sent by the recipient of the message to the source node. Upon expiration of a determined period, or "timeout," if no message MACK is received, a new sending of the message MS is initiated, for a limited number of iterations at the end of which the source node considers that the "route" or the communication with the receiving node is not or is no longer available. Such a source node can decide to abandon the cluster and return to a loose node status, or try to join another cluster.

The joining of a loose node to a node acting as Head is close to that implemented according to the LEACH solution. However, the terms for electing a Head and the terms of joining by a loose node to become a Member of a cluster can be very different, as for example set out by an alternative proposed jointly by the applicants. According to this alternative, only nodes actually able to perform a determined service are able to designate themselves as Head. The other nodes are free to arbitrate a competition between Heads and choose the Head that appears to be the best candidate to carry out the service to which they contribute.

Irrespective of the mode for electing heads, a first design mode of communicating devices consists of keeping the latter continually listening to radio communication frequencies to test the presence of messages coming from peer devices. Such an approach can cause significant energy expenditures and compromise the autonomy of the entire network. The second approach, known as Wake On Radio (WOR), consists of placing the nodes in relative sleep during the large majority of the time of the respective operations. The radio communication is in particular deactivated, because it consumes large amounts of electricity. Such nodes cannot, however, continue carrying out internal processing operations that do not consume much energy. Cyclically, such nodes wake up to listen to any messages coming from peers or to send enrollment, service, etc. messages in turn.

Figure 5:
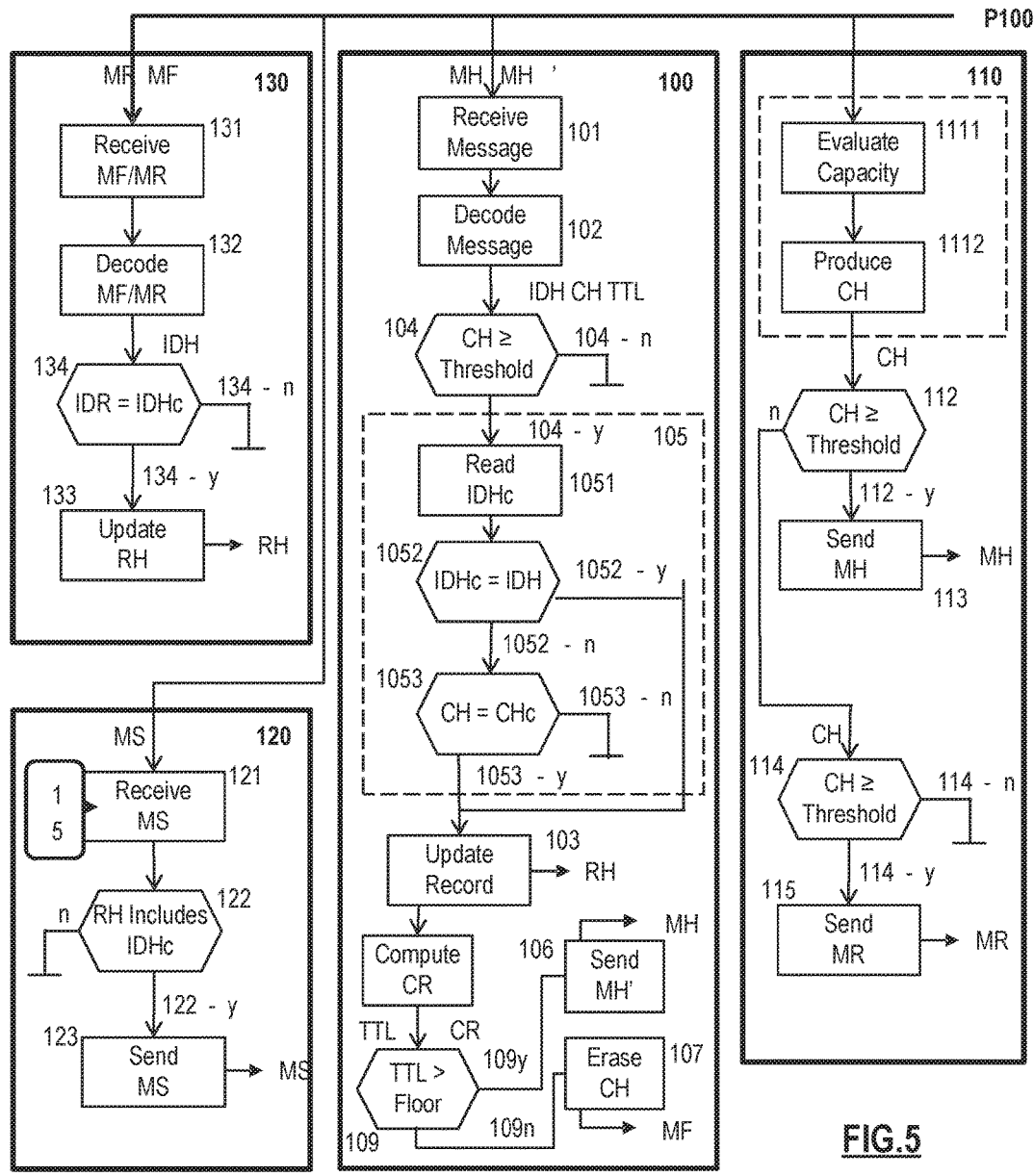
FIG. 5 shows a functional description of such a joining method according to the invention.
Figure 5:
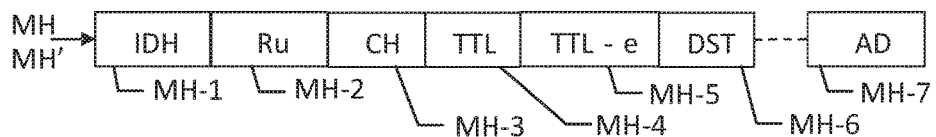

FIG. 5 illustrates a communication method P100 carried out by a device according to the invention, for example a device 10 described in connection with FIG. 2.

Such a communication method results from the implementation of the first processing operation 100 by the processing unit 11 of the device 10 in reaction to the receipt of the enrollment message MH.

As indicated in FIG. 5, an enrollment message MH includes a first field MH-1 encoding the identifier IDH of the device selected to act as Head. Such an enrollment message may also include a field MH-3 encoding a datum CH reflecting the capacity of said Head to perform a determined service S. Said message may further include a field MH-7 encoding various attributes or additional data AD including, non-limitingly and optionally, a datum characterizing the service S with which the potential datum CH is associated.

In the context of a multi-hop network, structure or cluster, an enrollment message can be relayed by a Member. When such an enrollment message has already been propagated by a Member (we will study the relay of such a message later, in particular in connection with step 106), this means that a new enrollment message has been developed, then sent by a relay Member. Reference MH' will denote a relayed enrollment message to distinguish it from the original enrollment message MH sent by a Head. Such a message MH' may include a field MH-2 encoding a datum Ru characterizing the uplink route, i.e., at least the identifier ID' of the relay Member and sender of said message MH'. Said route Ru may alternatively include the identifiers of the various relay Members upstream successively separating the receiving node of the message MH' from the Head node at the origin of the original enrollment message M H.

To control the depth of the cluster that the Head wishes to form, the invention sets out that such a message MH or MH' includes a field MH-4 encoding a datum TTL characterizing the ability, in number of hops, of a Member receiving said message MH or MH' to relay the latter and thus propagate the enrollment message within the network. Later, in connection with the processing operation 110 of the method P100, we will study the development of an enrollment message MH by a device designating itself Head, like the device 10 according to FIG. 2, according to the invention. The datum TTL of a message MH or MH' can advantageously consist of an integer value. Thus, when a Head sends a message MH encoding a value TTL equal to one, this means that the desired maximum depth is a maximum of one hop. A value TTL equal to three means that two separate Members on a downlink route could successively relay said enrollment message within the network.

A processing operation 100 according to the invention thus includes a first step 101 for receiving an enrollment message MH or MH' developed and sent by a communicating electronic device, like the node d2 or the node c3, described in connection with FIG. 1. The processing operation 100 further includes a step 102 for decoding said enrollment message MH or MH' and deducing the identifier IDH of the Head or even the identifier ID' of the relay Member (Ru) therefrom. Step 102 also consists of deducing the datum TTL and decrementing it by one unit. If the message MH or MH' thus decoded includes a datum CH reflecting the capacity of the Head to perform a given service S, the step 102 for decoding said enrollment message MH or MH' deduces said datum CH, or even any other datum of interest encoded in said message, therefrom.

The processing operation 100 further includes a step 103 for updating a record RH, arranged within the data memory 12 of the device, like the device 10 described in connection with FIG. 2. Said record RH is provided to record the value of the identifier IDH as current value IDHc of the identifier of a device elected to act as Head, for example the device d2 illustrated by FIG. 1. When the enrollment message MH' includes a field MH-2, the uplink route Ru, including the identifier ID' of the device having acted as relay Member, is recorded in the record RH. During the update 103 of said record RH, the value of the datum CH reflecting the capacity of the transmitting device to perform said service S can also be recorded in said record RH. The recorded value is denoted CHc, to reflect the current capacity of the Head to perform the service. In a network, like the network N1 described in connection with FIG. 1, the device 10 implementing such a method P100 becomes Member of the cluster whereof the transmitter of the message MH acts as Head. This is for example the case for devices acting as Member nodes c1 to c3, d1, d3 and e1 to e2 of the cluster C11 described in connection with FIG. 1. The potential storage of the capacity of said Head in the record RH makes it possible, upon receipt of a new message MH or MH' coming from another transmitting device, optionally to compare the capacity of the current Head with that of a new candidate. Later, we will study the case of competition between Heads, competition arbitrated by Member or loose nodes.

The invention further sets out that a node that is already Member of a cluster and/or loose may join the cluster of which the node having sent a message MH is a Member. Thus, according to one preferred alternative, step 103 of the processing operation 100 of the communication method P100, provided to update the record RH, may not be carried out, unless the datum CH, reflecting the capacity of the node wishing to act as Head, is greater than or equal to a determined minimum requirement threshold. Said processing operation 100 thus includes a step 104 for comparing the datum reflecting the capacity deduced in 102 of the message RH to said minimum requirement threshold. Thus, a candidate node 10 to join a cluster may be more demanding or selective than the minimum selection criteria of a Head. Said minimum requirement threshold is advantageously saved in the data memory 12, or constitutes a predefined constant set out in the program memory 14. It may advantageously be identical for all of the nodes.

As previously mentioned, enrollment messages MH can be transmitted regularly by one or several communicating devices situated within radio communication range, like the device 10i described in connection with FIG. 2. A device 10, acting as Member of a cluster can therefore be in a situation to receive and decode an enrollment message MH or MH', while said device 10 is already a Member of a cluster initiated by a Head.

Two cases then arise. According to a first situation, the device 10 has already exploited an enrollment message MH or MH' from a same device acting as Head. The identifier value IDH of the latter is therefore identical to that IDHc stored in the data memory 12 of the device 10. According to a second situation, the value of the identifier IDH deduced from the message MH or MH' is different from the value IDHc. The Member device is in this case in a situation to arbitrate a competition between two third-party devices capable of performing a same service.

In the case where the network according the invention provides for producing, within messages MH or MH', the capacity of a Head to effectively perform its role, the method P100 advantageously includes a step 105 after the step for decoding 102 an enrollment message MH and before the step for updating 103 the record RH comprising the current value IDHc of the identifier of the device acting as cluster head. This step 105 may advantageously consist of reading said current value IDHc in 1051, within said record RH. Then, step 105 may consist of comparing, in 1052, said current value IDHc to that IDH of the identifier of the device sending the enrollment message MH decoded in 102. In the case of the first situation mentioned above, said values IDHc and IDH are identical (situation symbolized by the link 1052-y in FIG. 5). The record RH can thus be updated in step 103. This action in particular makes it possible to update the datum CH within the record RH. Indeed, depending on the evolution of the operating context of the Head, the capacity of the latter to perform the service may have changed. It may be deteriorated, for example in case of a lower energy reserve. It may perhaps have improved, due to the disappearance of an obstacle that was detrimental to the transmission power of the signal by GPRS.

Conversely, in the case where the values IDH and IDHc are different (situation symbolized by the link 1052-n described by FIG. 5), a device capable of acting as Head enters into competition with that which is, in the eyes of the Member, currently the device acting as cluster head. The invention provides that step 105 may include a step 1053 for comparing the datum CH, reflecting the capacity of the device transmitting the enrollment message MH, to the datum CHc stored in the record RH, reflecting the capacity of the device currently acting as Head to perform this same service S. According to one advantageous embodiment, if the value of the datum CH deduced from the new enrollment message is greater than the value CHc (situation symbolized by the link 1053-y), then step 103 is carried out to update the record RH. The value IDHc assumes the value of the identifier of the transmitter of the enrollment message. The device 10 thus leaves the preceding cluster to join that for which the device transmitting the message MH acts as Head. In the reverse situation, if the value of the datum CH deduced from the new enrollment message is lower than or equal to the value CHc (situation symbolized by the link 1053-n), then step 103 is not performed, since the sender of the enrollment message is lower performing than the current cluster head.

To limit the joining frequency with different competing Heads and thus preserve the overall energy capacity of the network, in particular if the data CH and CHc, reflecting the respective capacities to perform a same service, are very close, the invention sets out favoring a certain "loyalty," albeit very relative, in favor of the device currently acting as Head, even when the latter proves to be lower performing then the competing device. Thus, if the values of the identifier IDH and IDHc are different (situation symbolized by the link 1052-n), then step 103 for updating the record RH is only carried out if (situation symbolized by the link 1053-y in FIG. 5) a significant deviation, equal to a predetermined non-zero constant, exists in favor of the device sending the enrollment message. Step 1053 can therefore be adapted so that the update 103 of the record RH is only done if the datum CH reflecting the capacity of the device sending the enrollment message MH is greater than or equal to that stored in the record RH increased by said deviation.

To be able to relay an enrollment message MH beyond the transmission range of the device designated as Head, the invention thus provides that a joining method P100 can include a step 106, following step 103, for updating the record RH of the device implementing said method P100. This additional step 106 consists of encoding and sending, via the communication means 13, an enrollment message MH' including, in the field MH-1, the identifier IDH of the device whose value IDHc is recorded in the record RH. Advantageously, if a datum CHc reflecting the capacity of said device to perform a determined service S is recorded in RH, then such a message further encodes a datum reflecting said capacity CH in the field MH-3. The message MH', produced in 106, further encodes (field MH-2, Ru) the identifier ID of the device implementing the method P100 acting as cluster Member relaying the enrollment message MH from the device acting as Head. Prior to any implementation of a step 106, the processing operation 100 includes a step 109 seeking to verify that the device implementing the method P100 is capable of relaying the message MH or MH' previously decoded in 102.

Such a step 109 consists of comparing the current value of the data and the TTL to a determined floor value, for example a zero value. Said current value of TTL corresponds to the field MH-4 of the message MH or MH' previously decoded and advantageously decremented in step 102. If the current value of TTL is strictly greater than said floor value (situation shown by the link 109y in FIG. 5), the enrollment message can be relayed. Step 106 previously described can then be implemented. Otherwise (situation shown by the link 109n in FIG. 5), step 106 is not implemented and said enrollment message is thus not relayed by the device.

In order to regulate the cluster depth induced by the reception of a message MH or MH' encoding a datum TTL lower than that of the previous enrollment message, the invention provides several embodiments.

A first embodiment consists of, jointly with the processing operation carried out in 109, comparing a duration, the starting point of which coincides with the update of the record RH in step 103, with a predetermined maximum waiting period during which no other enrollment message has been received. Such a duration may for example be measured by triggering a timer or initializing a counter incremented upon each predetermined unit of time. If said duration is greater than or equal to said predetermined maximum waiting period, the invention sets out that the device is no longer in a situation to send a service message to the current Head, in light of the silence of the latter. The device then implements a step 107 consisting of regaining a loose node status. Such a step in particular consists of erasing, within the record RH, the data related to the former current Head.

Figure 4:
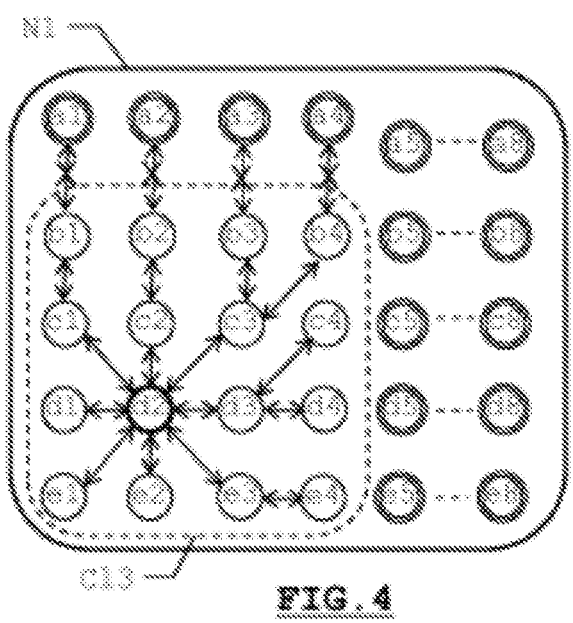

FIGS. 1 and 4 make it possible to illustrate this first embodiment. In connection with FIG. 1, a first enrollment message MH sent from the node d2 includes an initial value TTL equal to three. The original message MH is thus relayed, in the form of messages MH', by the Member nodes no more than two hops away from the Head d2. The nodes a1 to a4, three hops away from the Head d2, were able to join the cluster C11 under the action of the relay Members b1 to b4, respectively. FIG. 4 illustrates a situation on the same network N1 after that illustrated by FIG. 1. Such a situation results from a new transmission of a message MH by the node d2 now decoding a value TTL equal to two. According to the first embodiment according to the invention, said enrollment message MH can only be relayed, in the form of messages MH', by nodes no further than one hop away from the Head d2. The nodes a1 to a4, previously Members of the cluster C11, no longer receiving enrollment messages MH' from the nodes b1 to b4 during the predetermined maximum waiting period, regain a loose node status. A new cluster C13 whereof the node d2 acts as Head is created in place of the cluster C11.

Figure 3:
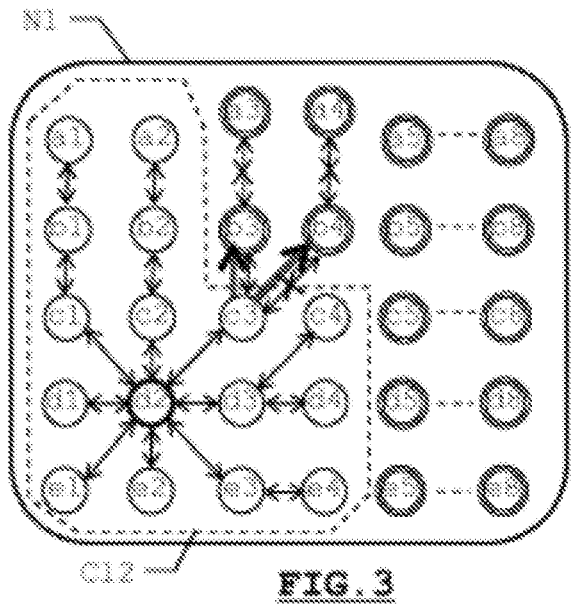
FIGS. 3 and 4 respectively describe two situations in which the depth of a cluster may be regulated dynamically according to the invention.

Alternatively or additionally, the invention sets out a second embodiment consisting of encoding, then sending an end of message relay message MF to devices located within radio communication range. Such a message MF is intended for nodes belonging to a downlink route. Later, in connection with FIGS. 3 and 5, we will study a processing operation 130 of a method P100 according to the invention, according to which a Member exploits such an end of relay message MF to regain a loose node status. Such a message MF includes the identifier, which we will denote IDF, of said transmitting device and a piece of information characterizing the message MF as an end of relay message. The processing operation 100 thus includes a step 107 for encoding and triggering the transmission of said message MF, advantageously according to a broadcast-type mode, by the communication means 13 of the device, under the impulse of the processing unit 11 implementing the method P100. Such messages MF are shown in FIG. 3 by an arrow in double lines. According to this example, the Member c3 thus transmits to nodes situated within communication range, in particular the nodes b3 and b4 respectively belonging to downlink routes of c3. A new cluster C12 is thus created in place of the cluster C11 illustrated by FIG. 1.

Thus, according to the first and second embodiments previously described, the invention offers a first mode of limiting the depth of a cluster by regulating the propagation of such enrollment messages. We can further observe that this regulation is completely dynamic. Indeed, as previously mentioned in connection with FIGS. 3 and 4, a Head can send a new enrollment message including a lower datum TTL, if it wishes to reduce the depth of the cluster of which it is cluster head. On the contrary, it may send a new enrollment message with an increased datum TTL in order to increase the depth. Later, we will study this mode in connection with a processing operation 110 of a communication method P100 according to the invention.

The invention sets out a second mode seeking to adjust the depth of the cluster. According to said second mode, the nodes implementing a method P100 according to the invention do not perform the temporal comparison previously set out in step 109 in light of a maximum waiting duration. To do away with repetitive management of the transmissions of enrollment messages and to thus preserve the energy consumption inherent to the exploitation of such messages MH or MH' by the network, the invention provides that an enrollment message MH or MH' includes a first additional field MH-5 including a datum TTL-e explicitly characterizing the maximum depth desired by the transmitting Head. Such a datum advantageously consists of an integer value. Thus, a value TTL-e equal to "one" means that the Head does not desire propagation (or relay) of the enrollment message. TTL-e thus describes, in the number of hops, the maximum distance for a node to be able to claim to become a Member of the cluster. In other words, the value TTL-e describes, increased by one unit, the maximum number of relays authorized on a same downlink route by one or several relay Members. The invention sets out that in addition to the field MH-5, the original MH and/or relayed MH' enrollment messages include a second additional field MH-6. Such a field encodes a datum DST that characterizes the distance, in number of hops, separating the transmitter from the message MH or MH' on a downlink route from the Head having developed the original enrollment message MH. Thus, according to the alternative, if a message MH is relayed once, the information DST within the relayed message MH' is equal to "1." If said enrollment message is relayed three times, the information DST within the enrollment message relayed by the furthest Member assumes the value "3." To that end, the processing operation 100 of a communication method P100 according to the invention can advantageously be adapted so that step 102, previously described, consists of deducing the values of the data TTL-e and DST from said decoded message MH or MH'. Step 103, also previously described, making it possible to update the record RH associated with the current Head and arranged in the data memory 12 of the device having received the enrollment message MH or MH', can advantageously consist of further recording, within said record RH, the datum DST previously incremented by one unit as well as the value of the datum TTL-e. Thus, each device of the network knows, owing to the content of the record RH, the distance in number of hops that separates it from a Head on a given uplink route Ru.

To adjust the depth of the cluster initiated by a Head, step 109 of a processing operation 100 of a communication method P100 according to the invention consists, like the previous mode, of comparing the current value of the datum TTL to a determined floor value, for example a zero value. Said current value of TTL corresponds to the field MH-4 of the message MH or MH' previously decoded and advantageously decremented in step 102. If the current value of TTL is strictly greater than said floor value (situation shown by the link 109y in FIG. 5), the enrollment message can be relayed. Step 106 previously described can be implemented. Otherwise (situation shown by the link 109n in FIG. 5), step 106 is not implemented and said enrollment message is not relayed by the device. Step 109 now consists of comparing the respective values of the data TTL-e and DST recorded in the record RH. If the value of the data DST is greater than that of the data TTL-e, this means that the device is no longer in a situation to send a service message the current Head, because the latter is too many hops away from the Head in light of the maximum depth desired by the latter. This case corresponds to a reduction of the depth of a cluster initiated by the current Head. The processing operation 100 further consists of triggering step 107, previously described, consisting of recovering a loose node status. The data related to the former current Head within the record RH are therefore decreased. Said step 107 may further consist of encoding, then triggering the transmission of the message MF, advantageously according to a broadcast-type mode, by the communication means 13 of the device, under the impulse of the processing unit 11 implementing the method P100. Such a situation is also described by FIG. 3, in which a node c3 emits an end of relay message MF.

We will now describe the actions taken by a communicating electronic device according to the invention that designates itself Head of a cluster. To that end, a communication method P100 according to the invention includes a processing operation 110. The latter may advantageously, but not necessarily, include a first evaluation step 111 of the capacity of the device 10 to provide a given service S to optionally designate or elect itself head of a cluster or Head. Such a step 111 may consist first of estimating, in 1111, one or several operating parameters of the device 10 in order to test the capacity of the latter to perform said service correctly. As a preferred example, let us suppose that said service consists of aggregating data collected and deduced from service messages MS, consolidating said data, including a message MC, and sending the latter via long-distance communication means 16 to a remote server whose mission consists of tracing the containers cooperating with communicating devices. To be able to perform this service, the device must clearly include suitable communication means, like the means 16. Furthermore, such a communication, for example of the GPRS type, mobilizes a significant quantity of electricity, if only to initiate the link. It is therefore mandatory for device, acting as Head, to have a sufficient energy reserve to bear such a stress. Furthermore, it is also preferable for the transmission power of a signal by GPRS to be as optimal as possible. Indeed, a low transmission power would create slowness, therefore an increased transmission duration that is particularly heavy in terms of electricity consumption, or even new successive transmission attempts in case of failure or pure and simple losses of messages MC.

Step 1111 also consists of a self-test or self-evaluation step of the device, for example, of the battery level 17, or even the transmission power of a signal by GPRS. Said step 1111 can also make it possible to evaluate other functional parameters of the device, for example the number of transmissions of messages MC. To that end, a message MC sending counter can be implemented by the processing unit 11, counter whose value may be recorded in the data memory 12. The estimate of the stress of the device 10 as Head may thus consist of reading said counter in the data memory 12.

The processing operation 110 advantageously includes a step 1112 for producing a datum CH reflecting the capacity of said device 10 to perform the determined service S. As an example, the production of such a datum CH by the processing unit may consist of the evaluation of an equation or a predefined function producing a metric integrating said estimated parameters, optionally respectively weighted to favor one parameter relative to another. For example, a GPRS transmission power estimate may consist of calculating a ratio corresponding to the estimated transmission power of a test signal, divided by a constant describing a typical maximum power, i.e., during optical transmission conditions.

In connection with the battery level, or more generally the energy source 17 of the device, step 1112 may force the processing unit to calculate a ratio corresponding to the estimated available energy in light of the energy when fully charged.

More generally, such a metric CH characterizing the capacity of a device to act as cluster head may be calculated, non-limitingly, by evaluating an equation such as $CH=K_1 \cdot f_1(p1)+k_2 \cdot f_2(p2)+ \ldots K_i \cdot f_i(p_i)$ for which, i being an integer greater than or equal to 1, K−1, K2, . . . , Ki constitute weights, optionally different, $f_1(\ )$, $f_2(\ )$, . . . , $f_i(\ )$ are calculation functions that may be different, for example a development of a ratio, and $p_1, p_2, \ldots, p_i$ are functional parameters of the device, including, by way of non-limiting examples, the electricity level of the source 17, a long-distance transmission power, the size of an available memory to store data, a computing power, etc.

The datum CH can thus be compared to an actual value. It may be composite, i.e., be a structured datum, including each functional parameter of the device, or including, instead of one of said functional parameters, a determined function of one of said functional parameters.

A datum CH optionally being produced in 1112, a method according to the invention includes a step 112 for comparing said datum CH to a minimum functional requirement threshold. If the datum CH is structured, the same is true for said threshold. The comparison 112 can consist of as many independent comparisons of a functional parameter to specific minimum functional requirement thresholds, to which a combining logic (of the AND, OR, etc. type) will be applied.

If step 112 demonstrates that the datum CH is greater than or equal to said minimum functional requirement threshold (link referenced 112-y in FIG. 3), the method P100 advantageously includes a step 113 for encoding and transmitting an enrollment message MH. Prior to such a transmission, the invention consists of providing said step 112 in order to determine the maximum depth of the cluster of which the device wishes to be the Head. This determination can follow, like a capacity CH produced in 1112, from a relationship taking into account one or several functional parameters of the device, such as $Dp = Q_1 \cdot g_1(p1) + Q_2 \cdot g_2(p2) + \ldots Q_i \cdot g_i(p_i)$ for which, i being an integer greater than or equal to 1, Q1, Q2, etc., Qi constitute weights, optionally different, $g_1(\ )$, $g_2(\ ), \ldots, g_i(\ )$ are calculation functions that are optionally different, for example the development of a ratio, and $p_1$, $p_2, \ldots, p_i$ are functional parameters of the device. Alternatively, the value of said depth Dp can also be predetermined and stored in the means 12 or result from a configuration. Like a node of a network of the LEACH type, a device, implementing a communication method P100 according to the invention, may nevertheless derogate from steps 111 and 112 and designate itself, or even be automatically or arbitrarily designated, Head, independently of its capacities to effectively perform this role. Nevertheless, unlike the prior art, a Head according to the invention masters the depth of the cluster that it initiates via the datum Dp.

As previously studied in connection with the non-limiting example illustrated in FIG. 5 and the processing operation 100, an enrollment message MH, encoded in 113, includes a first field MH-1 encoding the identifier of the device, which we reference IDH, as identifier of a device selected to act as Head. It may also include a field MH-3 encoding the datum CH reflecting the capacity of said device to perform the determined service S if the latter has been produced in 1112. The message MH may further include a field MH-7 encoding various additional attributes or data AD including, non-limitingly and optionally, a data characterizing the surface S with which the potential datum CH is associated.

To control the depth Dp of the cluster that the Head wishes to form, such a message MH includes, in a field MH-4, a datum TTL characterizing the ability, in number of hops, of a Member receiving said enrollment message to relay the latter and thus propagate said enrollment message within the network. As previously mentioned in connection with the processing operation 100 described as a non-limiting example by FIG. 5, such a datum TTL may advantageously consist of an integer value. Thus, when a Head sends a message MH including a value TTL equal to one, this means that the desired maximum depth is a maximum hop. A value TTL equal to three means that two different Members on the downlink route could successively relay said enrollment message.

According to the first mode described in connection with said processing operation 100, the value TTL included in 113 in the field MH-4 is initialized at the value Dp. The original message MH produced in 113 is distributed, for example broadcasted, by the first communication means 13 of said device under the action of the processing unit 11 implementing said method P100. Any communicating device situated within communication range, like the device 10i described in FIG. 2, can receive said message MH.

In order to respect the predetermined maximum waiting period tested in 109, the processing operation 110 is carried out iteratively with a frequency lower than said predetermined maximum waiting period. When the processing operation 100 advantageously includes a step 111 for estimating the capacity to perform a given service S, said capacity CH may be revised, encoded, then transmitted in 113. It may be increased to reflect a better capacity, or a decreased capacity in the opposite case. If the comparison 112 attests that the functional parameters of a device do not satisfy the functional minimums in 112, there is no enrollment message transmission MH. Thus, an electronic device that is not able to provide a given service, even though it theoretically has hardware or software resources to do so, cannot designate itself Head or form a cluster of communicating devices with a low amplitude or depth. It is in fact the same for the cluster depth Dp, which can be revised, upward or downward as previously mentioned. The datum TTL encoded in the field MH-4 of each original message MH sent in 113 can thus be initialized at different values from one iteration of the processing method 110 to another. As previously mentioned in connection with the processing operation 100, the information TTL of the different messages MH occurs as a regulator of the maximum depth of the cluster, and consequently energy expenses of the network caused by the processing of the messages exchanged within said network.

The processing operation 110 can include a step 114, optionally attached to step 112, for comparing the datum CH produced in 1112 with a functional minimum, attesting to an insufficient capacity to perform the service. Such a minimum threshold may be predetermined and recorded, like the threshold used in step 112, in the data memory 12. This step 114 and a fortiori a step 115 that optionally follows therefrom may advantageously follow the transmission 113 of an enrollment message MH. If the comparison 114 confirms (link 114-y in FIG. 5) that the device is no longer capable of performing the service S, the processing operation 110 of a communication method P100 according to the invention may advantageously include a step 115 for encoding and sending a cluster destruction message MR, advantageously broadcasted. This transmission of a message MR may be done by the communication means 13 of the device, under the impulse of the processing unit 11 implementing the communication method P100. Like an enrollment message MH, a cluster destruction message MR, sent from a device previously acting as Head but no longer in a situation to effectively perform a particular service S, includes the identifier of said device, denoted IDR. It may also include the datum CH characterizing the capacity, or in this case, lack of capacity to perform the services. Alternatively, such a message MR may simply associate an item of information characterizing the message MR as cluster destruction message with the identifier of the transmitting device. Such a message MR may also consist of an enrollment message MH including a datum TTL equal to zero. This step 115 advantageously may only be triggered if the transmitting device was previously acting as Head, so as to avoid needlessly sending irrelevant cluster destruction messages and also to prevent any undue exploitation of such messages by receiving nodes. In order for a device according to the invention to be able to detect that it was previously in a situation to act as Head, the processing unit 11 of said device may for example record, in the data memory 12, the value Dp translated in the field MH-4 (datum TTL) of the last message MH transmitted in 113. Said recording is done jointly with the triggering of the transmission of said message MH. A non-zero value of said value Dp recorded in the data memory 12 indicates that the device was acting as Head during the previous iteration of the processing operation 110. Such a value is advantageously reset to a zero value, or alternatively any other predetermined value characterizing a zero cluster depth, during the encoding and transmission of a cluster destruction message in 115. Said processing unit 11 may alternatively or additionally use a message transmission counter MC, as previously mentioned, saved in the data memory 12. During the comparison 114, a value of said counter, greater than its initial value, teaches that said device was acting as Head. At the end of the transmission of a message MR, said counter can be reset to the initial value.

However, any other action could be implemented by the processing unit 11 to validate the implementation of step 115, instead of the exploitation of the message MC transmission counter. As a non-limiting example, such an action may follow from the reception, by the device acting as Head, of an enrollment message from a third-party device, itself also acting as Head and whose datum reflecting its capacity to perform a same service is greater than its own. In this case, the processing unit 11 of the device implementing the method P100 triggers the step 115, thus withdrawing in favor of the better option. According to this last alternative, the invention provides for limiting the number of transmissions of cluster destruction messages MR, which is a direct result of a particularly dynamic and oscillating evolution of capacities of the nodes to act as Heads, causing very sustained competition between numerous Heads. Such a situation may for example be encountered during railway transport of a multitude of containers, each cooperating with a communicating device according to the invention and for which the determined service consists of regularly sending, by GPRS, information related to the contents of the containers. The ability of the Heads to transmit over long distances may change often. To address this difficulty, the invention sets out the integration, into the implementation of step 114, of a "competition factor," for example a positive integer, greater than "1," the value of which may be recorded in the memories 12 of the various nodes. Thus, a Head, receiving an enrollment message MH from a third-party node, does not strictly compare, in step 114, the data CH reflecting the respective capacities to perform a same service. Step 114 consists of comparing the datum CH deduced from the enrollment message MH multiplied by the competition factor. Thus, if said factor is greater than "1," for example "1.25," then the node, implementing step 114, is penalized by the exploitation of said factor in light of the competitor. Thus, even if the datum CH of said node reflects a capacity better than that of the Head having sent the message MH, the application of the competition factor virtually improves that of the competitor. In this case, the node implements a step 115, sends a cluster destruction message MR and rejoins the cluster of the competitor as Member. Such a solution makes it possible to limit excessive cluster creations and/or distractions compromising the energy capacity of the network. It further makes it possible to limit the number of nodes able to act concomitantly as Heads. Indeed, depending on the considered service S, for example including a long-distance transmission, an excessive number of nodes acting in concert as Heads would for example excessively exhaust the energy reserves of the network. The competition factor can therefore be seen as a parameter regulating the number of Heads and the dynamics of the adaptability of the network to its environment.

In order to implement the second aforementioned regulation mode in connection with the processing operation 100 described relative to FIG. 5, the message encoded in 113 includes a first additional field MH-5 encoding a datum TTL-e explicitly characterizing the maximum cluster depth desired by the Head sending the enrollment message. Such a datum TTL-e advantageously consists of an integer value. Thus, a value TTL-e equal to "one" means that the Head does not wish for propagation (or relay) of the enrollment message. A value strictly greater than "one" describes, in number of hops, increased by one unit, the number of relays authorized on a same downlink route by one or several relay Members. The invention sets out that in addition to the field MH-5, an original enrollment message MH includes a second additional field MH-6. Such a field includes a datum DST that characterizes the distance, in number of hops, separating a transmitter from an enrollment message MH or MH', on a downlink route from the Head having developed the original enrollment message MH, of said Head. Thus, according to this alternative, if a message MH is relayed once, the information DST within the relayed message MH' is equal to "one." If the enrollment message is relayed three times, the information DST within the enrollment message relayed by the furthest away Member assumes a value equal to "three." In order to implement the second mode, step 113 consists of initializing the value TTL-e, encoded in the field MH-5, at the value Dp produced in 112. The datum TTL is initialized with the value recorded in the data memory 12. It corresponds to the maximum depth of the cluster produced upstream from the transmission of an enrollment message triggered during the previous iteration of the processing operation 110. The value TTL is therefore encoded in the field MH-4 of a message MH ready to be transmitted by the device. The datum DST encoded in the field MH-6 of said message MH is in turn initialized at a zero value or any other predetermined value indicating a zero distance. Indeed, the Head is separated from itself by a zero distance in number of hops. At the end of triggering of the transmission of the message MH, the current value of Dp is updated in the data memory 12. The coexistence of the fields MH-4, MH-5 and MH-6 within a message MH allows the latter, as we previously mentioned in connection with the processing operation 100 described by FIG. 5, to propagate said enrollment message using relayed messages MH' within the cluster. Thus, the Members receiving such a message MH or MH' can verify whether they are able to relay service messages in particular or to regain a loose node status. The invention thus allows easy regulation of the depth of a cluster under the impulse of its Head. It is thus possible to maintain, increase or reduce said depth through the combination of the data TTL, TTL-e and DST.

The invention also allows a Member of a cluster to regulate its potential relay Member function according to its own energy or communication capacities. While respecting the instructions from the Head, by implementing processing operations 100 and 110 according to the first or second mode, a Member can be restrictive with respect to its relay function in favor of other Member or Affiliated nodes belonging to a downlink route. To that end, the invention sets out that step 109 can, like the potential step 111 and step 112 respectively for producing a capacity CH to designate itself Head and a cluster depth Dp, produce a capacity CR to relay service or other messages in favor of third-party devices belonging to a downlink route. Such a capacity CR can advantageously be calculated as $CR = R_1 \cdot h_1(p1) + R_2 \cdot h_2(p2) + \ldots R_i \cdot h_i(p_i)$ for which, i being an integer greater than or equal to 1, $R1, R2, \ldots Ri$ constitute weights, optionally different, $h_1(\ ), h_2(\ ), \ldots, h_i(\ )$ are calculation functions that may be different, for example the development of a ratio, and $p_1, p_2, \ldots, p_i$ are functional parameters of the Member device. Depending on the content of CR, and compared with one or several predetermined minimum functional thresholds and for example recorded in the data memory 12, steps 106 or 107 are implemented. Thus, a relay Member, upon receiving a message MH or MH' from the Head of the cluster to which it belongs, may not automatically propagate said enrollment message in light of CR whereas the elements decoded in 102 (TTL, or even TTL-e and DST) would have taught it to propagate said enrollment message. Whether the first mode or the second mode previously described is favored, the invention guarantees an unparalleled continuity of service by automatically assigning relevant roles to the various nodes of a network of communicating electronic devices. The robustness of such a network according to the invention is increased tenfold as a result.

In order to convey service messages from a Member or Affiliated node, the method P100 further includes a processing operation 120 triggered, by way of non-limiting examples, upon reception of a service message transmitted by a third-party device or as a reaction to the taking of environmental measures by the device. Within the record RH, saved in the data memory 12, the pair of identifiers of the cluster Member and cluster head (Head) devices constitutes the route information necessary to relay a service message MS to said Head. Indeed, such processing 120 includes a step 123 for sending a service message MS to the device acting as Head for a determined service S. Such a step 123 is implemented following a prior step in order, for example, to collect a measurement from a sensor 15 related to the temperature prevailing within a container, against which the device 10 implementing the communication method P100 is affixed. Of course, such a step 123 is also subject to the presence (step 122 in FIG. 5) of a record RH including the value IDHc of an identifier of a device or node acting as Head (situation symbolized by the link 122-y in FIG. 3). Depending on whether said record RH includes a direct uplink route Ru, i.e., only a Head identifier value is not present in the record RH, or an indirect uplink route, i.e., said record RH further includes an identifier value of a relay Member, the message MS is sent directly to said Head or to said relay Member.

As previously mentioned, such a transmission 123 of the service message MS can also be triggered by the reception 121 of a service message MS from a Member of a same cluster and sent to the device 10, which implements said joining method P100 and acts as relay Member. Following the reception of such a service message from a Member of a same cluster, step 121 can therefore include a step for receiving and decoding such a message MS, or even for temporarily saving the data contained in said decoded service message MS in the data memory 12. The relay of said message MS made thus be reflected by a deferred retransmission.

A communication method P100 according to the invention further includes a processing operation 134 exploiting a cluster destruction message MR as previously mentioned, sent from a Head and/or interpreting an end of relay message MS sent from a Member that is no longer in a situation of performing its relay function, due to its own capacity CR or the strict application of a request to reduce the cluster depth from the Head having sent an enrollment message MH according to the invention. Such a processing operation 130 of a communication method P100 according to the invention includes a first step 131 for receiving a cluster destruction message MR or an end of relay message MF developed and sent by a third-party communicating electronic device, for example a device 10i, having previously had the capacity to act as Head or Relay Member.

As previously studied in connection with steps 114 and 115, a cluster destruction message MR includes the identifier IDR of the device having sent said cluster destruction message MR. The processing operation 130 that includes a step 132 for decoding said cluster destruction message MR and deducing the value of said identifier IDR therefrom of the device sending the cluster destruction message. The reception of such a message MR by a device acting as Member of the cluster affected by the destruction message indicates a strict instruction to abandon the cluster, said Member regaining a loose node status. To that end, the processing operation 130 of a method P100 according to the invention advantageously includes a step 133 for updating the record RH encoding the current value IDHc of the identifier of a device acting as Head, to erase said current value or replace it with a predetermined value reflecting an absence of device identifier acting as Head. Of course, said update 133 of the record RH is only done if (situation symbolized by the link 134-y in connection with FIG. 5) the value of the identifier IDR deduced from the cluster destruction message MR is identical to the current value IDHc recorded in said record RH. The processing operation 130 thus includes a step 134, before the step 133, for implementing said comparison of identifier values IDR and IDHc.

In the context of the exploitation of a multi-hop network, like an enrollment message MH, a cluster destruction message MR can advantageously be relayed by a Member becoming loose by the implementation of step 133, by triggering the transmission of such a message MR thus related to potential other Members of the cluster being destroyed.

Regarding the end of relay message MF, step 131 consists of deducing the identifier, which we denote IDF, of said transmitting device and detecting the information characterizing the message MF as an end of relay message. The reception of such a message MF by a device acting as Member of the same cluster and belonging to a downlink route from the transmitting device of the message MF, reflects a strict instruction to abandon the cluster, said Member regaining a loose node status. Step 133 then consists of updating the record RH, in the data memory 12, in particular to erase the current value IDHc or replace it with a predetermined value reflecting an absence of the device identifier acting as Head. Of course, said update 133 of the record RH is only done (step 134) if (situation symbolized by link 134-y in connection with FIG. 5) the value of the identifier IDF deduced from the end of relay message MF is comprised in the uplink route Ru recorded in said record RH.

Irrespective of the configuration of a communication method P100 according to the invention, one preferred adaptation mode of a communicating electronic device, like the device 10 described in connection with FIG. 2 implementing such a method P100, consists of recording or downloading, in the program memory 14, a computer program P, including a plurality of program instructions, which, when they are executed or interpreted by the processing unit 11 of said device 10, cause the implementation of said communication method P100.

Figure 2:
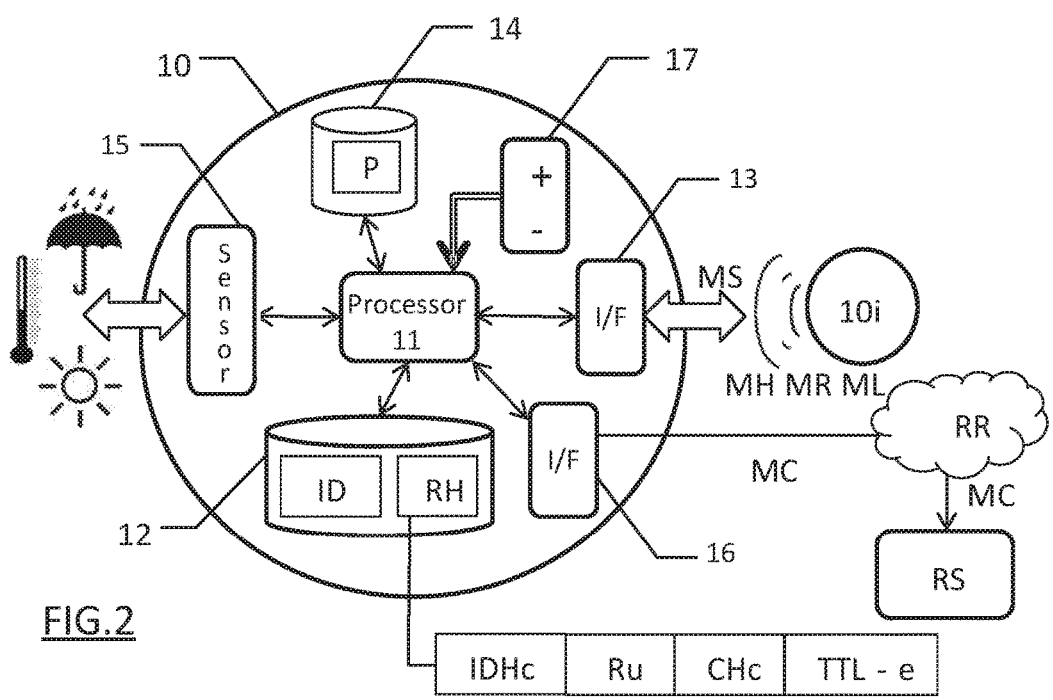
FIG. 2, already partially described, presents the functional architecture of a communicating electronic device according the prior art and according to the invention when the latter is adapted for implementing a method for joining a cluster of devices communicating with peers via a wireless communication network, said method being according to the invention.

The invention has been described through one preferred example application related to the monitoring of containers of goods, solid, fluid or liquid merchandise, said containers respectively cooperating with communicating electronic devices, such as the devices 10 and 10i according to FIG. 2, implementing a communication method, like the method P100 illustrated in FIG. 5, said devices each including a sensor 15 cooperating with a processing unit 11 to measure and collect a property related to the internal and/or external environments of said containers.

Such devices could be used for any other application different from that seeking to send collected data using a long-distance link. They could also, alternatively or additionally, perform one or several other services. To that end, as previously mentioned, the data memory 12 of each device 10, 10i may include not only a single record RH dedicated to a determined service S, but a plurality of records RHn, for example forming a table, respectively dedicated to specific services Sn. The enrollment MH or MH', service MS, or even cluster destruction MR or end of relay MF messages would, according to this alternative, include an item of information making it possible to identify the determined service Sn affected by each of said messages.

Furthermore, the invention thus relates to any system including a plurality of communicating electronic devices according the invention. More particularly, the invention relates to any traceability system for containers in a storage area or transfer platform, said system further including a remote entity to collect and exploit messages MC transmitted from one or several of said devices when they act as Head. Such a system has unparalleled performance levels, in terms of energy autonomy, robustness and adaptability to operating conditions that are incomparable relative to those imparted by the known solutions, such as, for example, the LEACH method. Indeed, owing to the invention, the exploitation of Heads, from their elections to the performance of the action(s) affected by a given service, is optimal, preventing any superfluous or inefficient communication within the network or intended for third-party entities.

The invention claimed is:

1. A communication method within a network comprising a plurality of communicating electronic devices, said method being implemented by a processing unit of a first communicating electronic device from among said communicating electronic devices within the network, said first communicating electronic device further including said processing unit, a data memory, first communication interface providing wireless nearby communication with a third-party communicating electronic device of the network situated within communication range, said data memory and said first communication interface cooperating with said processing unit, the data memory including the value of an identifier dedicated to said first communicating electronic device and a record to store the current value of an identifier of a second communicating electronic device acting as head of a cluster, said method including:
a step for receiving, via the first communication interface, an enrollment message delivered and transmitted by a communicating electronic device within the network, said enrollment message encoding the identifier of the second communicating electronic device acting as cluster head;
a step for decoding said enrollment message and deducing the value of said identifier of the second communicating electronic device acting as cluster head therefrom and, if applicable, the value of the identifier of a third communicating electronic device having relayed said enrollment message;
a step for updating the record so that the latter stores, as current identifier value of the device acting as cluster head, said value of the identifier of the second device acting as cluster head deduced from the decoded enrollment message and, if applicable, said record also saves, as uplink route toward said second communicating electronic device acting as cluster head, the value of the identifier of the third communicating electronic device;
wherein:
said enrollment message further includes a datum TTL reflecting the ability of a communicating electronic device receiving said enrollment message to relay the latter;
the step for decoding said enrollment message further deduces the value of said datum TTL therefrom;
the step for updating the record is adapted so that said record stores the current value of said datum TTL previously decremented by one unit;
and wherein method further includes:
a step for producing a relayed enrollment message, said message comprising:
a. a first field encoding the current identifier value of the device acting as cluster head recorded in the record;
b. a second field characterizing an uplink route toward the second communicating electronic device acting as cluster head, and encoding the identifier of the first communicating electronic device;
c. a third field encoding the current value of the datum TTL recorded in the record; and
a step for triggering the transmission by the first communication interface of said relayed message if a prior step, comprising comparing the current value of the datum TTL recorded in the record to a determined floor value, attests that said current value of TTL is strictly greater than said floor datum.

2. The communication method according to claim 1, wherein:
the received enrollment message includes a datum reflecting the capacity of the second communicating electronic device acting as cluster head to provide a given service;
the step for decoding said enrollment message further deduces, from said enrollment message, said datum reflecting said capacity; and
the step for updating the record further comprising recording, in said record, the value of said datum reflecting the capacity of the device acting as cluster head.

3. The communication method according to claim 2, wherein the step for updating the record and recording the current identifier value of the communicating electronic device acting as cluster head therein is performed if the datum reflecting said capacity is greater than or equal to a determined minimum requirement threshold.

4. The communication method according to claim 1, including:
a step for receiving an end of relay message developed and transmitted by the third communicating electronic device, said end of relay message including the identifier of said third communicating electronic device;
a step for decoding said end of relay message and for deducing the value of said identifier therefrom; and
a step for updating the record encoding the current value of an identifier of the device acting as cluster head, to erase said current value or replace it with a predetermined value reflecting an absence of identifier of the device acting as cluster head, said update of the record only being done if the value of the identifier deduced from the end of relay message is comprised in the record as uplink route toward said device acting as cluster head.

5. The communication method according to claim 1, wherein:
the step comprising comparing the current value of the datum TTL recorded in the record to a determined floor value further comprises producing a capacity to relay messages in favor of communicating electronic devices, said communicating electronic devices belonging to a downlink route from the first communicating electronic device, according to a functional parameter of said device, and comparing said produced capacity to a predetermined minimum functional threshold;
the step for triggering the transmission by the first communication interface of said relayed message only being implemented if said produced capacity is strictly greater than said predetermined functional minimum threshold.

6. The communication method according to claim 1, wherein the step for updating the record following the decoding of an enrollment message further comprises triggering, concomitantly with the update of the record, a timer for measuring a duration, said communication method including a step for comparing said duration to a predetermined maximum waiting period and updating said record and erasing or replacing the current identifier value of the communicating electronic device acting as cluster head with a predetermined value reflecting absence of identifier of the communicating electronic device acting as cluster head.

7. The communication method according to claim 1, wherein:
- an enrollment message includes a field encoding a datum TTL-e characterizing the maximum cluster depth desired by the second communicating electronic device acting as cluster head and a field encoding a datum DST characterizing the distance separating the communicating electronic device sending said enrollment message on a downlink route from the communicating electronic device acting as cluster head;
- the step for decoding said enrollment message deduces the values of said data TTL-e and DST therefrom; and
- the step for updating the record is also adapted so that said record stores the value of the datum TTL-e and the value, previously incremented by one unit, of the datum DST;
- said communication method further including a step for comparing said values TTL-e and DST recorded in the record and for updating said record and erasing or replacing the current identifier value of the communicating electronic device acting as cluster head with a predetermined value reflecting absence of device identifier acting as cluster head.

8. The communication method according to claim 7, including:
- a step for determining the maximum depth of the cluster of which the first communicating electronic device wishes to be cluster head according to an operating parameter of said device; and
- a step for encoding an enrollment message and triggering the transmission of said message by the first communication interface, said message including fields respectively encoding:
  a. the identifier of said device;
  b. the datum TTL whereof the value is recorded in the record;
  c. the datum TTL-e whereof the value is initialized at that of the maximum depth of the determined cluster; and
  d. the datum DST whereof the value is initialized at a value indicating a zero distance in number of hops.

9. The communication method according to claim 1, including:
- a step for determining the maximum depth of the cluster for which the first communicating electronic device wishes to be cluster head according to an operating parameter of said device; and
- a step for encoding an enrollment message and triggering the sending of said message by the first communication interface, said message including a first field encoding the identifier of said first communicating electronic device and a second field encoding the datum TTL whereof the value is initialized to that of the produced maximum cluster depth.

10. The communication method according claim 9, including a step for evaluating the capacity of the first communicating electronic device to perform a determined service, said step comprising estimating an operating parameter of said device and producing a datum reflecting the capacity of said device to perform said determined service, and for which the step for encoding an enrollment message comprises providing, within said enrollment message, a field encoding said datum reflecting said capacity prior to triggering the transmission of said message by the first communication interface.

11. The communication method according to claim 10, including a step for comparing the datum reflecting said capacity to a minimum functional requirement threshold and for which the step for triggering the transmission of the enrollment message is only implemented if the datum reflecting said capacity is greater than or equal to said minimum functional requirement threshold.

12. A non-transitory computer-readable medium encoded with a computer program product including program instructions which, when they are:
- previously recorded in a program memory of a communicating electronic device further including a processing unit, first communication interface providing wireless nearby communication with any other electronic devices situated within the communication range, a data memory recording the value of an identifier dedicated to the device and a record for encoding the current value of an identifier of a device acting as cluster head, said memories and said first communication interface cooperating with said processing unit; and
- executed or interpreted by said processing unit,
cause the implementation of a communication method according to claim 1.

13. A communicating electronic device including a processing unit, a data memory, a program memory, first communication interface providing wireless nearby communication with any other communicating electronic device situated within communication range, said memories and said first communication interface cooperating with said processing unit, the data memory including the value of an identifier dedicated to the communicating electronic device and a record to include the current value of an identifier of a device acting as cluster head, said communicating electronic device being including, in the program memory, the instructions for a computer program product according to claim 12.

14. A system including a plurality of communicating electronic devices according to claim 13.

15. The system according to claim 14, including a plurality of containers of goods, solid, fluid or liquid merchandise, said containers respectively cooperating with the communicating electronic devices, the latter each including a sensor cooperating with the processing unit to measure and collect a property related to the internal and/or external environments of said containers.

* * * * *